United States Patent

Hayner

[11] Patent Number: 6,138,048
[45] Date of Patent: Oct. 24, 2000

[54] METHODS AND DEVICES FOR CONTROLLING A DISK DRIVE

[75] Inventor: David A. Hayner, Austin, Tex.

[73] Assignee: Motorola, Inc., Schaumburg, Ill.

[21] Appl. No.: 08/923,185

[22] Filed: Sep. 4, 1997

[51] Int. Cl.[7] .................................................. G05B 13/02
[52] U.S. Cl. .......................... 700/31; 701/99; 318/786; 369/44.11; 369/44.17; 369/44.27; 369/44.29; 369/44.34; 369/44.35; 369/44.36; 369/44.26
[58] Field of Search .................................... 701/99; 706/1, 706/4, 5; 318/786, 788; 369/44.11, 44.27, 44.29, 44.34, 44.35, 44.36; 700/31

[56] References Cited

U.S. PATENT DOCUMENTS

| | | |
|---|---|---|
| 4,293,913 | 10/1981 | Nishimura et al. ................ 364/474.27 |
| 4,540,923 | 9/1985 | Kade et al. .............................. 318/561 |
| 5,656,906 | 8/1997 | Iwashita et al. .................... 318/568.23 |

*Primary Examiner*—William Grant
*Assistant Examiner*—McDieunel Marc

[57] ABSTRACT

The present invention provides a control system (200) having a digital controller (212) producing output signals at a plurality of update times. Control circuitry is responsive to the controller (212) and outputs at least one command signal to the plant (210) at a different time than the update times. A method of controlling a plant (210) is also provided. The method includes the steps of providing a digital controller (212) to determine a plurality of switching times and to produce output signals at a plurality of update times, and providing at least one command signal to the plant (210) at a different time than the update times.

15 Claims, 6 Drawing Sheets

METHODS AND DEVICES FOR CONTROLLING A DISK DRIVE

FIELD OF THE INVENTION

The present invention generally relates control systems. More particularly, the present invention relates to methods and apparatus for controlling plants.

BACKGROUND OF THE INVENTION

Control systems have been widely used in a variety of applications, such as, for example, industrial manufacturing applications, navigational systems, communication systems, and information storage and retrieval systems. The control systems usually maintain a plant in a selected state (i.e., position, velocity, acceleration, temperature, pressure, or pH) despite unknown external inputs which may tend to force the plant to drift away from the selected state. The control systems may also cause the plant to change from one state to another state.

One method to change a plant from one state to another state is via the use of external controls. For example, maximum amplitude control signals (i.e., maximum current, voltage, temperature, torque, pressure, or flow) can be applied to the plant over time periods of specific lengths. For a system modeled as an Nth order linear system, the use of the maximum control signals over N consecutive, possibly equal, time periods can cause the plant to move from one arbitrary state to any other reachable state in the minimum possible time. The duration of these N consecutive time periods is a set of N real values, continuously distributed from zero to infinity. The specific length of these time periods is a continuous function of the parameters defining the plant. In order to further reduce the transition time of the plant from one state to another, the magnitude of the control signals can be increased.

In a digital control system, data is generally collected and processed at discrete time intervals. These time intervals relate to the times at which the digital control system collects data from a sensor measuring the state of the plant. The time intervals are typically called the sampling times of the control system. In response to these sampled measurements of the plant and to requests issued to the control system from a supervisory system, the control system generates updated commands (i.e., voltage, current, torque, pressure, flow, and temperature commands). These updated commands usually drive an actuator and cause a change in the state of the plant. These commands are typically generated at discrete time intervals. The rate at which the commands are generated and directed to the plant is often referred to as the update rate. In many cases, the update and sampling rates are equal. As a result, the digital controller can typically only take actions at discrete points in time.

The difficulty in utilizing a digital control system to achieve a truly minimal-time state transition is that the required switching times of the command signals are continuously distributed in time, whereas the digital control system typically take actions at discrete points in time. In addition, the digital control system may not have an update rate which can correlate with the required switching times for the possible or required state transitions. Furthermore, the time difference between the available update times are often very large relative to the switching precision required by the dynamics of the plant. Consequently, the commands of the digital control system have to be activated for longer or shorter periods of time than desired, resulting in an error in the final state (i.e., overshoot or undershoot of one or more states). In order to compensate for discrete update times, and still arrive at the desired final state, the control system must vary the magnitudes of control signals. Since the signals can not be increased, they must be lowered, and as a consequence, the signals must be applied for a longer time duration. As a result, the system is no longer truly time optimal since maximum command values are not used.

SUMMARY OF THE INVENTION

The present invention relates to methods and devices for controlling the state of a plant. The methods and devices of the present invention can apply control signals at any selected or desired point in time. The control signals may further have any desired or predetermined amplitude.

The methods and devices of the present invention can accurately and quickly change the state of the plant to another state (i.e., position, velocity, acceleration, temperature, or pH) with reduced overshoot or undershoot. The state of the plant can be changed independent of the sampling rate(s) and/or update rate of the system. The state of the plant can be changed from an initial state to a final state in a reduced amount of time, as allowed by the dynamics of the plant.

One device in accordance with the present invention includes a control system having a digital controller producing output signals at a plurality of update times. Control circuitry is responsive to the controller inputs and it outputs at least one command signal to the plant at a different time than the update times.

One method in accordance with the present invention includes the steps of providing a digital controller to determine a plurality of switching times and to produce output signals at a plurality of update times, and applying at least one command signal to the plant at a different time than the update times.

The invention, together with further objects and attendant advantages, will best be understood by reference to the following detailed description of the presently preferred embodiments of the invention, taken in conjunction with the accompanying drawings.

DETAILED DESCRIPTION OF THE PREFERRED EMBODIMENTS

Before explaining the present invention in detail, it should be noted that the invention is not limited in its application or use to the details of construction and arrangement of parts illustrated in the accompanying drawings and description, because the illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limitation.

Figure 1:
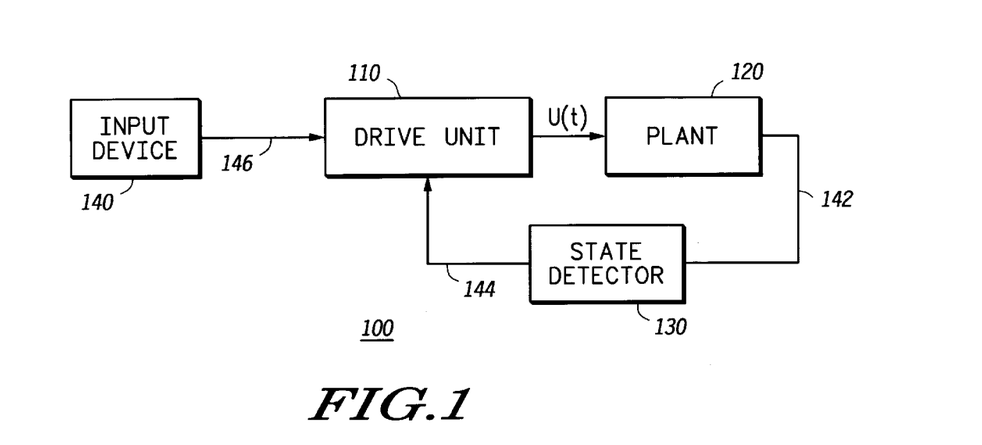
FIG. 1 is a block diagram of a system for controlling a plant.

Referring now to the drawings, FIG. 1 illustrates a block diagram of a system 100 for controlling a plant 120 including, for example, an actuator or servo motor. The system 100 can change the plant 120 from an initial or first state to a final or desired state (i.e., position, velocity, acceleration, temperature, pressure, or pH) with near zero error. The system 100 can provide control/command signals having predetermined amplitudes to the plant 120 at any selected or desired point in time.

As shown in FIG. 1, the system 100 preferably includes a drive or control unit 110, a state detector 130, and an input device 140. The drive unit 10 provides control/command signals u(t) to the plant 120 to control or change the state of the plant 120. The drive unit 110 may cause the plant 120 to move an object from an initial position to a desired or final position. The drive unit 110 may also change the condition of the environment of the plant 120 from an initial condition to a desired condition (i.e., temperature, pressure, etc.). The plant 120 may include, for example, an electromagnetic servo device (i.e., a rotary actuator or coil type actuator), an electro-hydraulic system, a temperature regulating system, a pressure control system, a voice coil motor (VCM), or any other suitable device for changing the state of the system 100.

The plant 120 is preferably modeled as a partially controllable and partially observable Nth order continuous linear system. The state of the plant 120 is preferably observed or sampled at discrete time intervals, $nT_1$ (where n is an integer and $T_1$ is a selected or predetermined time increment). The input control/command signals u(t) can be applied to the plant 120 at predetermined or desired points in time, $nT_2$ (where n is an integer and $T_2$ is a selected or predetermined time increment). It will be recognized that time interval $T_1$ may equal time interval $T_2$. It is also contemplated that the plant 120 may be a non-linear system.

The state detector 130 of the system 100 detects or senses a signal indicative of the state of the plant 120 on line 142. For example, the state detector 130 may detect, for example, the position, velocity, and/or acceleration of an object moved by the plant 120. Alternatively, the state detector 130 may detect, for example, the temperature, pressure, and/or pH of an environment or material of the plant 120.

The state detector 130 processes the signals indicative of the state of the plant 120 and generates a feedback or output signal on line 144 to the drive unit 110. The state detector 130 is preferably a position, velocity, temperature, or pressure sensor. It is contemplated that the state detector 130 may be any suitable device that can measure or estimate one or more states of the plant 120.

The input device 140 of the system provides commands or requests to the drive unit 110. The input device 140 can provide the desired or final state of the plant 120 to the drive unit 110 on line 146. The input device 140 may be a host computer or any other suitable device.

The drive unit 110 of the system 100 receives the requests from the input device 140 to perform various operations. The drive unit 110 also receives signals indicative of the present state of the plant 120 from the state detector 130. The drive unit 110 generates the control/command signals u(t) that are provided to the plant 120 of the system 100 to change or control the state of the plant 120.

The drive unit 110 may be implemented utilizing conventional hardware components and circuitry designs, computer programming, or a combination thereof. For example, the drive unit 120 may include a microprocessor, such as, for example, a 68HC11 available from Motorola. The drive unit 120 may also be controlled with any suitable software which, can be written in assembly language, C language, or any other suitable programming language. It will be recognized that the drive unit 110 may be any suitable device to drive the plant 120.

The drive unit 110 can provide the control/command signals u(t) to cause the plant 120 to reach a final state with near zero error. The control/command signals may be any suitable form, such as, for example, flux, torque, current, or voltage. The control/command signals can be applied to the plant 120 to change the state of the plant 120 to the final state in the minimum amount of time allowed by the system. For example, for a second order plant, the control/command signals may be applied to the plant 120 to accelerate the state of the plant 120 as fast as possible to a changeover position near or exactly at a half-way position between the initial and final state. The changeover position may be achieved at one-half of the time to reach the final state. At the changeover position, an opposite, but equal magnitude, control/command signal may be applied to the plant 120 to decelerated the state of the plant 120 as fast as possible from the changeover state to the final state. Once the final state is reached, a control/command signal is applied to the plant 120 to maintain the plant 120 at the final state.

The final state of the plant 120 may be a zero state (i.e., the velocity, acceleration, or pressure may equal zero) or any other suitable state. The final state of the plant 120 can be provided to the drive unit 110 by the input device 140. The final state may also be applied to the drive unit 110 by a user or operator or may be read from a storage device.

Figure 2:
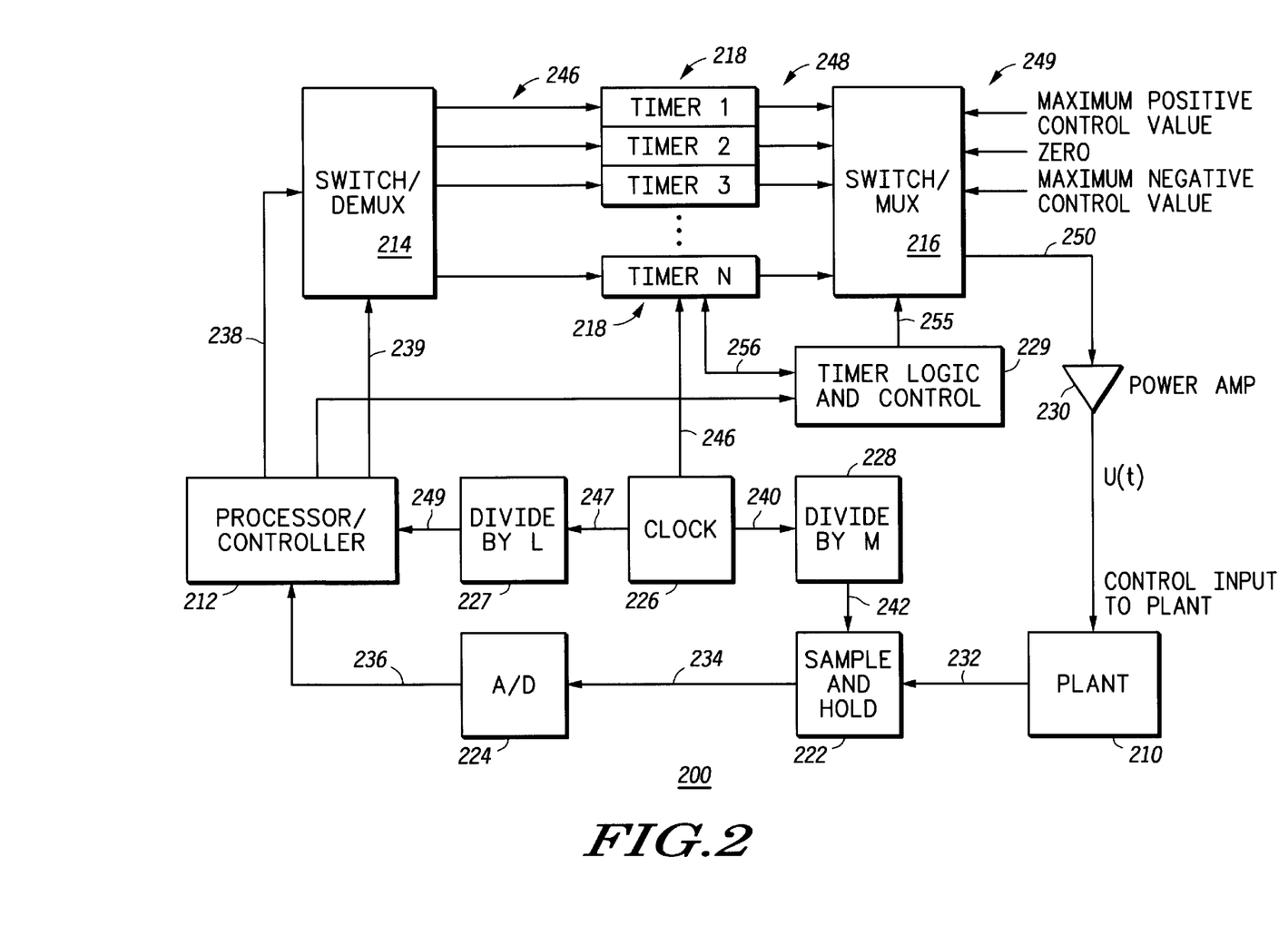
FIG. 2 is a detailed block diagram of a system to control a plant.

FIG. 2 illustrates a detailed block diagram of a system 200 to control a plant 210. The system 200 preferably includes a processor or controller 212, switches or demultiplexers 214 and 216, a timer unit 218 (N timers being shown), a sample and hold device 222, an analog-to-digital (A/D) converter 224, a clock 226, dividers 227 and 228, a timer logic and control unit 229, and a power amplifier 230. It will be recognized that the system 200 may be implemented utilizing a microprocessor or any other suitable combinations of logic circuits. It is also contemplated that the system 200 may be carried out with any suitable hardware components and circuitry designs, computer programming, or a combination thereof.

The plant 210 is coupled to or in communication with the power amplifier 230 and the sample and hold device 222. The plant 210 receives control/command signals u(t) from the power amplifier 230 to control the state of the plant 210. The plant 210 may include a rotary type actuator, a linear type of actuator, a voice coil motor (VCM), or any other suitable actuator for controlling the plant.

The sample and hold device 222 of the system 200 is coupled to or in communication with the divider 228, the A/D converter 224, and the plant 210. The sample and hold device 222 samples the output of the plant 210 at a predetermined or selected sampling rate. Preferably, the sample and hold device 222 samples the output of the plant 210 at M/L times slower than the clock rate provided to drive the controller 212.

The sample and hold device 222 detects or senses signals indicative of the state of the plant on line 232. The sample and hold device 222 may detect, for example, the position, velocity, and/or acceleration of an object moved by the plant. The sample and hold device 222 may also detect, for example, the temperature, pressure, and/or pH of an environment or material controlled by the plant 210. The sample and hold device 222 generates an analog signal on line 234 to the A/D converter 224. The sample and hold device 222 may be part of the circuitry of the A/D converter 224. It is contemplated that the sample and hold device 222 may be any suitable device to measure the state of the plant 210.

The A/D converter 224 of the system 200 receives analog signals from the sample and hold device 222 that corresponds to the state of the plant 210. The A/D converter 224 converts the analog signals into digital signals. The A/D converter 224 provides the digital signals on one or more lines 236 to the controller 212.

The controller 212 of the system 200 is coupled to or in communication with the A/D converter 224, the divider 227, and the switch 214. The controller 212 receives the digital signals from the A/D converter 224 and provides digital output signals on one or more lines 238 to an input of the switch 214.

The controller 212 preferably executes one instruction for each clock cycle provided by the combination of the clock 226 and the divider 227. It will be recognized that the controller 212 may execute a plurality (i.e., tens to thousands) of instructions to generate one digital output signal on line 238 in response to a single sample provided on line 236 from the A/D converter 224.

The controller 212 preferably determines a set of switching times to provide control/command signals to change the state of the plant 210 from an initial state to a final state. These switching times are based on the dynamics of the plant and the maximum allowed control/command signals. The controller 212 may also determine the magnitude or sign (i.e., positive-negative, or zero) of the control/command signals provided to the plant 210.

The controller 212 preferably includes a microprocessor operating at about 20 MHz, such as, for example, 68HC11 available from Motorola. The controller 212 may sample the input from the A/D converter 224 at the rate of about 10 KHz. The controller 212 can be programmed with any suitable software to carry out the functions described above. The software can be written in assembly language, C language, or any other suitable programming language. It will be recognized that the controller 212 may be any suitable device that can provide appropriate output signals to control the control/command signals provided to the plant 210.

The clock 226 of the system 200 is preferably coupled to the divider 227, the timer unit 218, and the divider 228. The clock 226 preferably operates at a substantially higher frequency than the sampling rate of the controller 212. The clock 226 can be operating at about 800 MHz. The clock 226 generates an output signal on a line 240 to the divider 228. The divider 228 divides the output signal by M and transmits an output signal to the sample and hold device 222 on a line 242. The clock 226 also provides an output signal to the timers 218 on a line 246 and an output signal to the divider 227 on a line 247. The divider 227 divides the clock signal by L and transmits this lower frequency clock signal to the controller 212 on a line 249. It will be recognized that separate clocks may be used to control the controller 212 and the timer unit 218.

The switch 214 of the system 200 is coupled to or in communication with the controller 212 and the timer unit 218. The switch 214 receives data indicative of an action or switching time of the control/command signals from the controller 212 over one or more lines 238. The switch 214 also receives an enabling signal over one or more lines 239. When the switch 214 is enabled, the switch 214 transmits the data to a desired timer via the selection lines 246.

The timer unit 218 of the system 200 is preferably coupled to or in communication with the switch 214, the switch 216, and the clock 226. Each of the timers of the timer unit 218 can be loaded with a count down time for providing the control/command signals to the plant 210. The timer unit 218 may be part an ASIC or any other suitable logic. It will be recognized that the timer unit 218, switches 214 and 216, and the timer logic and control unit 229 may all be part of the controller 212.

The switch 216 of the system 200 is coupled or in communication with the timer unit 218, the power amplifier 230, and the timer logic and control unit 229. The switch 216 receives signals from the timers over lines 248 and receives the control/command signals over line 249. Preferably, the switch 216 receives a maximum positive control/command value (i.e., +5 volts), a maximum negative control/command value (i.e., −5 volts) and zero volts over the lines 249. The switch 216 transmits the appropriate control/command signals to the power amplifier 230 over lines 250. The switch 216 may be part ASIC or any other suitable logic.

The timer logic and control unit 229 of the system 200 initiates the timer action. The timer logic and control unit 229 is preferably coupled to or in communication with the controller 212, the timer unit 218, and the switch 216. As the timers of the timer unit 218 count down, the timers communicate with the timer logic and control unit 229 over line 258 which selects the appropriate output (i.e., maximum positive or negative, or zero) to be applied to the power amplifier 230 on line 250. The appropriate timer output of the timer unit 218 is selected by the timer logic and control unit 229 by commanding the switch 216 over one or more lines 255.

The timer unit 218 and switch 214 may be programmed by the controller 212 to produce all N control/command signals between two samples collected by the sample and hold device 222. The controller 212 may also generate a multiplicity of control/command signals in the time required for one instruction to be processed by the controller 212 or for one output signal to be produced by the controller 212. The timer unit 218 and switch 214 can be programmed to provide the control/command signal to the plant 210 at any desired point in time. For example, the control/command signals can be applied asynchronously to the plant 210 relative to the output, operating cycle, or sampling rate of the controller 212. It is also contemplated that the control/command signals may have any desired amplitude as further described below.

Figure 2A:
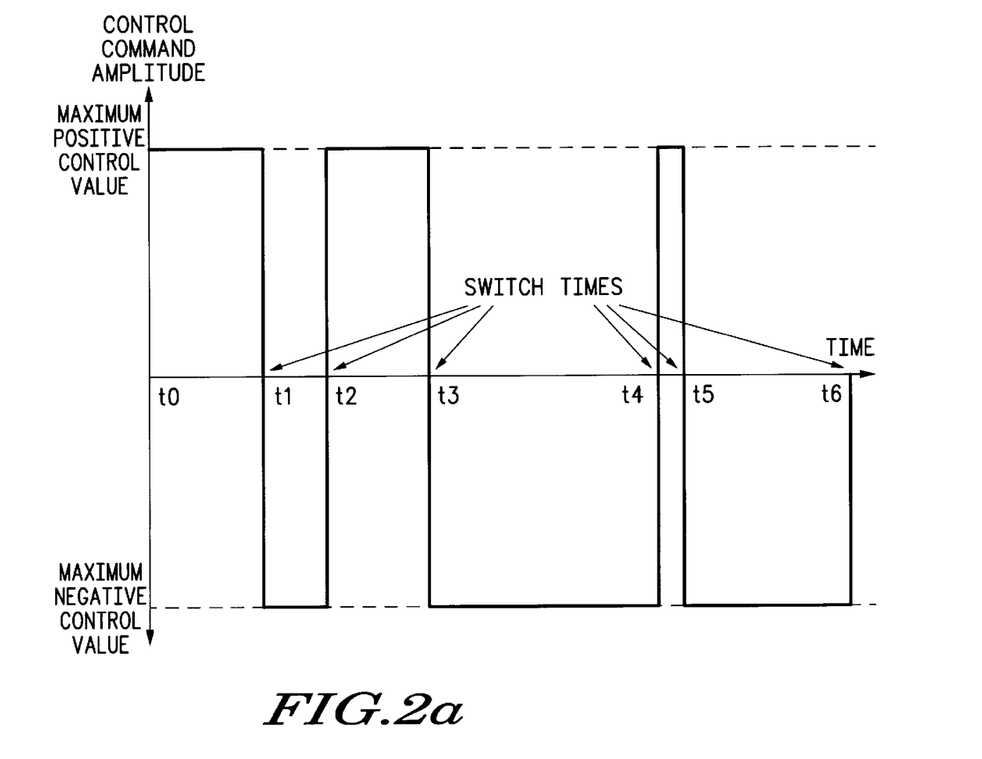
FIG. 2a is a graphical representation of an exemplary sequence of control signals for a sixth order system.

As shown in FIG. 2a, an exemplary diagram of a sequence for control/command signals for a sixth order system to move a plant from a first or initial state to a second or final state is illustrated. Maximum positive control signals are provided to the plant at time intervals $t_0$ to $t_1$, $t_2$ to $t_3$, and $t_4$ to $t_5$, and maximum negative control signals are applied to the plant at time intervals $t_1$ to $t_2$, $t_3$ to $t_4$, and $t_5$ to $t_6$.

Figure 3:
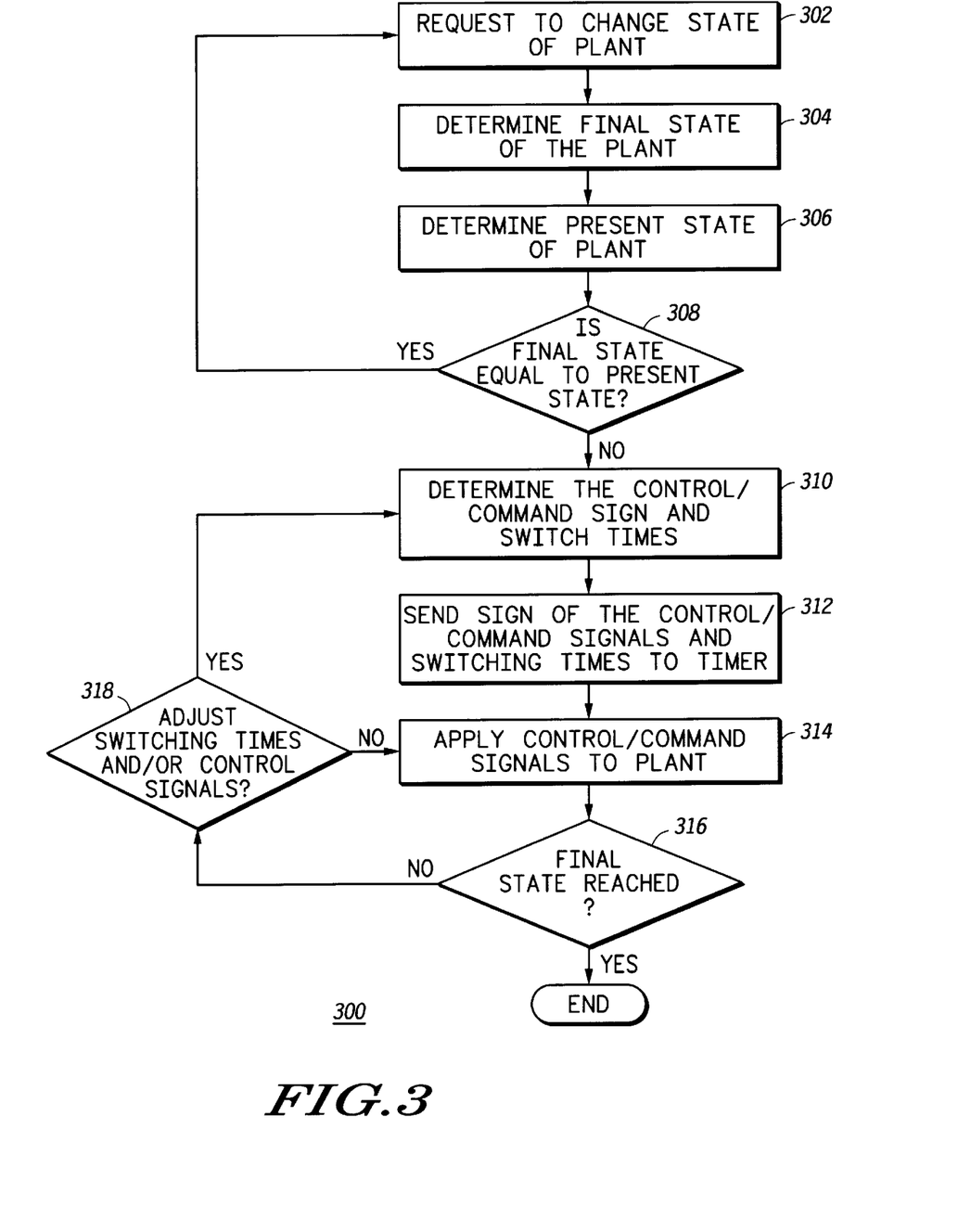
FIG. 3 is a flow diagram of a process carried out by the system of FIG. 2.

Referring now to FIG. 3, a flow diagram of a process 300 to change the state of the plant 210 of FIG. 2 is illustrated. At block 302, a command or request is generated to change the state of the plant 210 to a desired or final state. At block 304, the final state of the plant is determined, and the present or initial state of the plant is determined at block 306.

At block 308, the present state of the plant is compared to the final state. If the final state is the same as the present state of the plant, the process returns to block 302. If the final state differs from the present state, the process proceeds to block 310.

At block 310, one or more switch times and signs of the corresponding control signals (i.e., maximum positive, maximum negative, or zero) are determined. It will be recognized that the process can also be used to apply arbitrary control magnitudes at specified points in time as further described below. At block 312, the switch times and signs of the control/command signals are sent to the timer unit 218 and the timer unit 218 is programmed with the switching times of the control/command signals. One or more of the control/command signals are then applied to the plant at block 314.

At block 316, the system determines whether the final state has been reached. If the final state is not reached, the process proceeds to block 318. At block 318, it is determined whether to adjust the switching timers and/or the signs of the control/command signals. If the present and/or expected state error is sufficiently small, no changes are made to the switching times loaded into the timers. If the system determines that the present and/or future error is or will be too large, then the system preferably computes updates to the switch times loaded in the timers. For example, system may calculate the deviation between the present state and the desired state in order to determine whether to adjust the switching times of the control/command signals. If the switching times are to be adjusted, the adjusted times are determined at block 310. If the switching times are not to be adjusted, the calculated, non-adjusted times are applied to the plant at block 314.

In operation, the system will apply a first control/command signal to the plant until the a first timer times out. When the first timer times out, a second control signal is applied to the plant until the second timer times out. This process continues until N control/command signals are provided to the Nth order plant causing the plant to reach the final state. The control signals preferably alternate between maximum positive values and minimum negative values with the last control signal preferably equal to zero. During this process, the controller 212 is processing measured state data (if available during the course of this state transition) to determine any corrections to the switch times and/or sign of the control/command signals.

Figure 4:
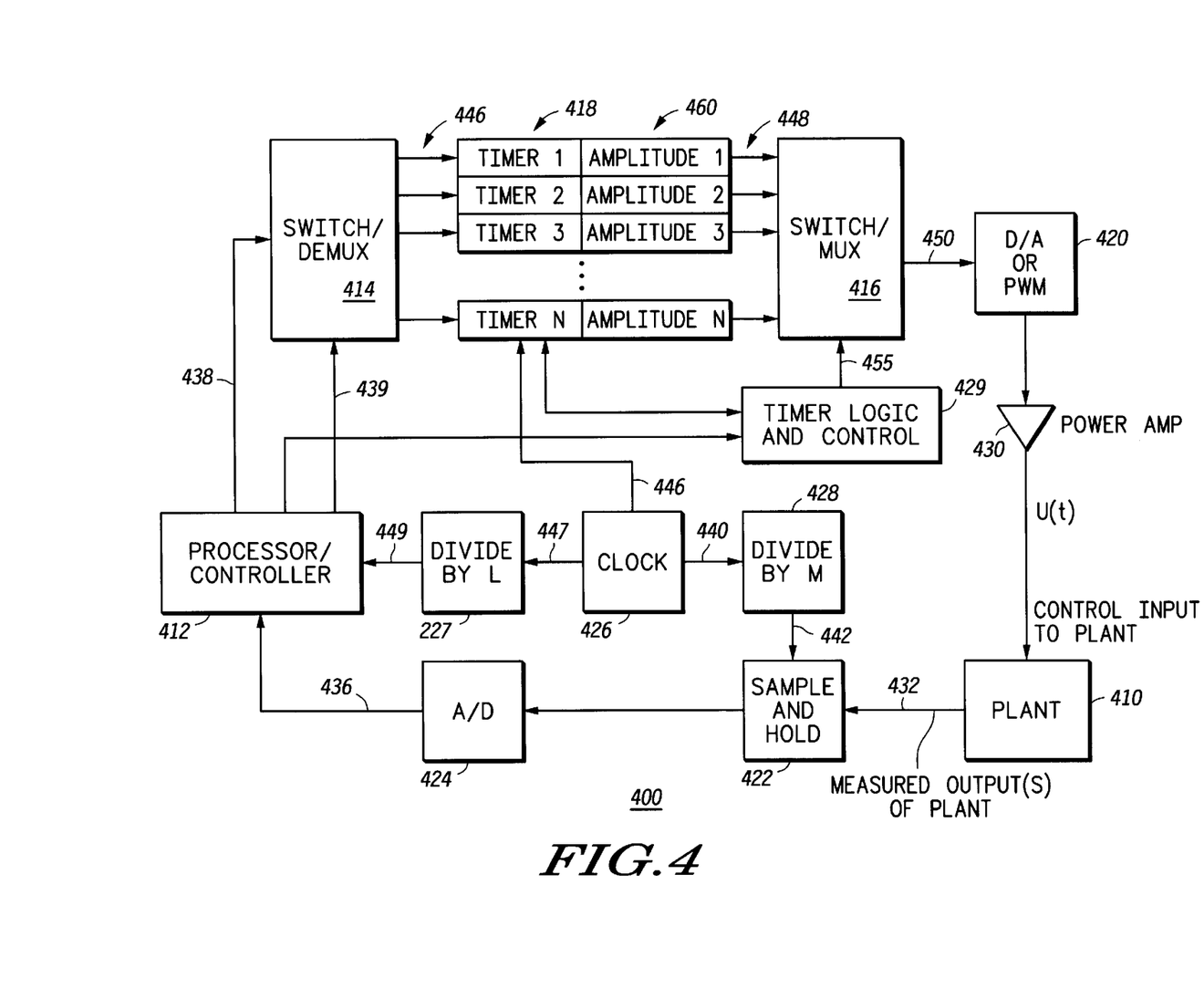
FIG. 4 is a block diagram of another embodiment of a system for controlling a plan.

Referring now to FIG. 4, a block diagram of another embodiment of a system 400 to control a plant 410 is illustrated. The components of the system 400, which generally correspond to the components of the system 200 of FIG. 2, are designated by like reference numerals in the four-hundred series. The system 400 includes an output control register 460 associated with each timer of the timer unit 418 and a pulse-width modulation (PWM) system or a digital-to-analog (D/A) converter 420. The D/A converter 420 converts the arbitrary amplitude signals from the switch 416 on line 450 to analog signals that can drive the plant 410 via the power amplifier 430. This allows the system 400 to provide arbitrary control amplitudes at arbitrary times to the plant 410. If any of the commanded control amplitudes are less than the maximum allowable control amplitude, then the system may achieve the final state in more than the optimal time interval.

Figure 5:
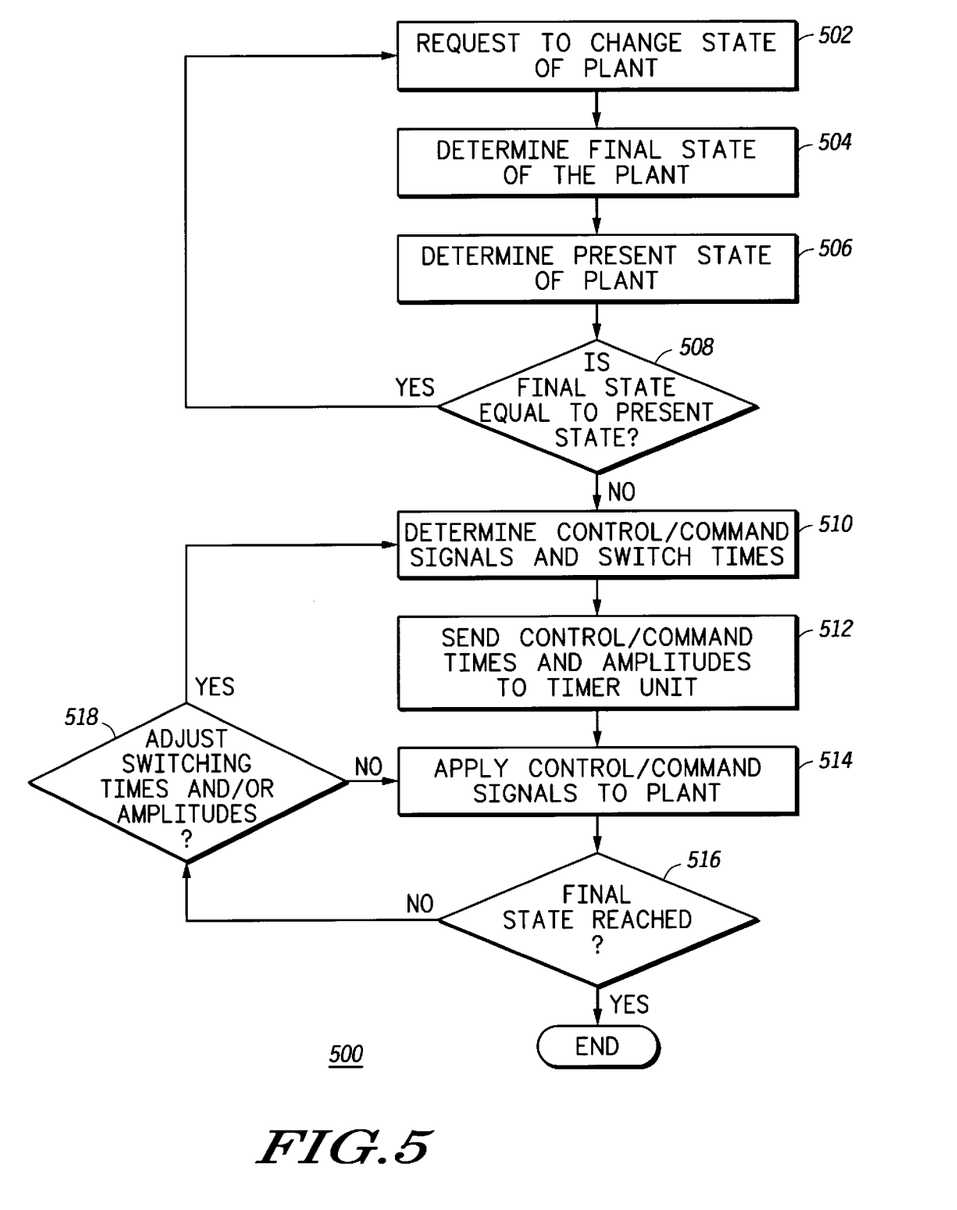
FIG. 5 is a flow diagram of a process carried out by the system of FIG. 4.

Referring now to FIG. 5, a flow diagram of a process 500 to change the state of the plant 410 of FIG. 4 is illustrated. The steps of the process 500, which generally correspond to the steps of the process 300 of FIG. 3, are designated by like reference numerals in the five-hundred series. The operation and function of the process 500 is substantially the same as the process 300 of FIG. 3 except that the amplitudes of the control/command signals can be adjusted at block 518 and applied to the plant 410.

Figure 6:
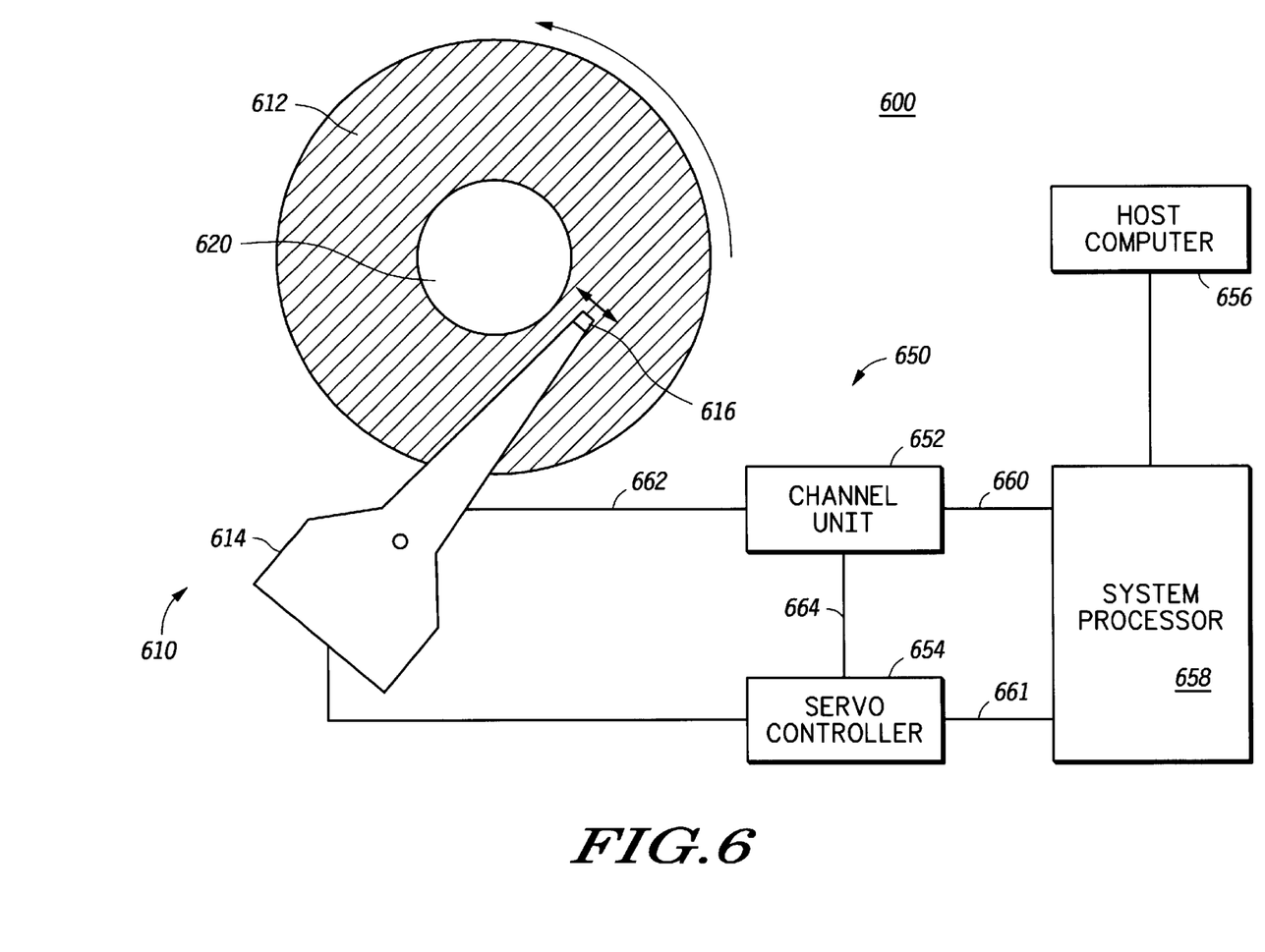
FIG. 6 is a block diagram of a hard disk drive system.

FIG. 6 illustrates an exemplary block diagram embodiment of a hard disk drive system 600 embodying the principles of the present invention. The system 600 preferably includes one or more disks or platters 612 (one being shown), an actuator 614, and one or more read/write heads 616 (one being shown). The disks 612 are mounted on a shaft or spindle 620 which is driven by a drive motor (not shown). The disks 612 may be rotated at about 4000–7000 revolutions per minute (RPM). The disks may be magnetic disks, optical disks, magnetic-optical disks, or any other suitable disks or recording media. It is contemplated that the system 600 may have any suitable number of disks.

The disk 612 has upper and lower recording faces or surfaces. Each of the recording surfaces of the disks preferably includes a plurality of concentric tracks. The tracks of the disks 612 are divided into radial or track sectors with each sector storing multiple bytes of information or data. The radial sectors preferably contain data sections and identification sections. The data sections are preferably angularly spaced and interspersed at various radial sectors on the disks 612.

The identification sectors may have servo burst or information stored thereon. The servo burst on the disks can be utilized to determine the position of the heads 616 and to maintain the heads over the center of a desired or selected track. The heads may detect about 70–90 servo bursts per revolution. It is contemplated that the servo information may be located on one or more disks or a dedicated servo disk.

The heads 616 of the system 600 are mounted adjacent to the recording surfaces of the disks and are positioned over a desired track to transfer data to and from the disks 612. Each of the heads 616 may write information on its associated recording surface and/or read information from the recording surfaces. The heads 616 may be uniformly moved across the rotating disks to locate the heads at a particular track of the disks. One of the heads is selected to collect and process the data stored on the surfaces of the disks or to write data to the disks.

The control system 650 of the system 600 includes a channel unit or state detector 652, a servo controller 654, a host computer 656, and a system processor 658. The host computer 656 controls the overall operation of the system 600. The host computer 656 generates requests or commands that are provided into the system processor 658. The system processor 658 provides the commands or requests to the channel unit 652 and the servo controller 654 to perform various operations. It may be recognized that the system processor 658 and the servo controller 654 may be represented by different software modules running on a single processor or may be represented by a plurality of processors.

The channel unit 652 of the control system 650 receives requests or commands over a line or bus 660 from the system processor 658 to perform data transfer operations, such as, for example, read and write operations. The channel unit 652 also receives information recorded on the disks 612 via the heads 616.

The channel unit 652 collects signals indicative of a servo burst from the heads 616 at discrete time intervals over lines 662. The channel unit 652 processes the servo bursts to generate a signal indicative of the position of the heads 616 (i.e., track number and track sector) with respect to the disks 612. It is also contemplated that the channel unit 652 may also provide the velocity, and/or the acceleration of the head.

The channel unit 652 may also generate distance information indicative of the remaining distance to a desired track or to a desired disk sector based upon a servo burst. The channel unit 652 is preferably a 32H4915 from Silicon Systems Inc. It is contemplated that the channel unit 652 may be any suitable device to receive and reproduce information received from the heads.

The servo controller 654 of the control system 650 receives requests or commands from the system processor 658 over line or bus 661 to perform various operations. The servo controller 654 also receives signals indicative of the state or position of the heads 620 from the channel unit 652 over line or bus 664. The servo controller 654 utilizes a control algorithm to generate control command signals u(t) to the actuator 618 to control the movement of the heads 616.

The servo controller 654 provides control command signals to cause the head 620 to move to the selected track. The servo controller 654 also receives signals indicative of the present state of the head from the channel unit. The servo controller 654 generates input control/command signals u(t) that are provided to the actuator of the system 600 to change or control the state of the actuator.

The servo controller 654 can provide input control/command signals to cause the actuator to reach a final state with near zero error in a reduced time period, essentially independent of the sampling rate of the system. The construction and function of the servo controller 654 is substantially similar to the controller of FIG. 2.

The methods and devices of the present invention allow control/command signals to be applied to a plant or actuator at any selected or desired point in time to change the state of the plant or actuator. The desired points in time are preferably independent of the sampling output and data processing rates of the controller (i.e., the control/command signals are applied to the plant at different times than the controller samples the state of the plant and/or the controller produces an output signal). The state of the plant can be accurately and quickly changed to another state (i.e., position, velocity, acceleration, temperature, or pH) with minimal overshoot or undershoot. The state of the plant can be changed from an initial state to a final state in the shortest time possible allowed by the dynamics of the plant.

Although the present invention has been described in detail by way of illustration and example, it should be understood that a wide range of changes and modifications can be made to the preferred embodiments described above without departing in any way from the scope and spirit of the invention. Thus, the described embodiments are to be considered in all respects only as illustrative and not restrictive, and the scope of the invention is, therefore, indicated by the appended claims rather than the foregoing description. All changes that come within the meaning and range of equivalency of the claims are to be embraced within their scope.

What is claimed is:

1. A control system adapted for use in a hard disk drive system having a motor, the control system comprising:
   a sampling device to sample an output of the motor, the sampling device sampling the output at a sampling frequency having a sampling period, the sampling device generating feedback signals;
   a digital controller in communication with the sampling device, the controller generating a plurality of switching times as a function of the feedback signals and producing a plurality of controller output signals at a plurality of update times, wherein at least a portion of the plurality of switching times occur during the sampling period;
   a digital timing device having a plurality of timers;
   a first programmable switch to select a timer within the digital timer device, the digital timer device storing the plurality of switching times and producing a plurality of timer output signals at the plurality of switching times; and
   a second programmable switch responsive to the digital timer device, the second switch providing a plurality of command signals to the plant upon receipt of the output signals from the digital timer device, wherein the plurality of switching times occur at times other than the update times.

2. The control system of claim 1 where in the plurality of timers of the digital timer device further include a plurality of registers to store amplitudes of the command signals and the digital timer device has a digital counter.

3. The control system of claim 1 wherein the digital timer device receives a clock signal having a different clock rate than that of a clock signal received by the controller.

4. A control system for controlling a motor control system, the motor control system adapted for use in a hard disk drive system, the control system comprising:
   a digital controller producing a plurality of controller output signals at a plurality of update times, wherein the update times correspond to sampling times of the motor; and
   a control circuit responsive to the digital controller, the control circuit outputting at least one command signal to the motor at a time other than the update times wherein the control circuitry includes a programmable digital timer, the command signal applied to the motor upon expiration of the digital timer.

5. The control system of claim 4 wherein an amplitude of the at least one command signal is determined by the controller.

6. The control system of claim 4 wherein the control circuitry includes a timer unit to store data.

7. The control system of claim 4 wherein the controller generates a plurality of switching times.

8. The control system of claim 7 wherein the plurality of switching times generated by the controller are represented by a plurality of multi-bit signals.

9. The control system of claim 8 wherein the multi-bit signals represent numerical values and the motor drives a disk drive that stores data.

10. The control system of claim 4 wherein the control circuit includes:
    a first timer producing a first signal for a first period of time; and
    a second timer producing a second signal for a second period of time that occurs after the first time period.

11. The control system of claim 4 further comprising:
    a first clock applying a first clock signal to the digital controller at the first clock rate; and
    a second clock applying a second clock signal to the control circuit at a second clock rate.

12. The control system of claim 11 wherein the second clock rate is higher than the first clock rate.

13. The control system of claim 11, wherein the first and second clock signals are asynchronous with respect to one another.

14. The control system of claim 4 wherein the control circuit includes a timer external of the controller.

15. The control system of claim 4 wherein the control circuit includes a digital timer that is programmable by the controller.

* * * * *